United States Patent [15] 3,661,711
Kubota et al. [45] May 9, 1972

[54] METHOD OF PRODUCING L-HISTIDINOL BY FERMENTATION

[72] Inventors: Koji Kubota, Kawaski-shi; Teruo Shiro, Chigasaki-shi, both of Japan

[73] Assignee: Ajinomoto Co., Inc., Tokyo, Japan

[22] Filed: Dec. 23, 1968

[21] Appl. No.: 786,361

[30] Foreign Application Priority Data

Dec. 30, 1967 Japan..................................42/85303

[52] U.S. Cl..............................................195/30
[51] Int. Cl. ..........................................C12b 1/00
[58] Field of Search......................195/28, 29, 30, 42, 43, 51

[56] References Cited

UNITED STATES PATENTS 3,231,478   1/1966   Uemura et al. ...........................195/29
3,329,577   7/1967   Okumura et al..........................195/29

OTHER PUBLICATIONS

Kloos et al. J. Gen. Microbiol, Vol. 39, p. 185– 194; 1965 Vol.
Vogel et al. J.A.C.S.; Vol. 73; p. 1897– 8; 1951

*Primary Examiner*—A. Louis Monacell
*Assistant Examiner*—Gary M. Nath
*Attorney*—Kurt Kelman

[57] ABSTRACT

Histidinol is accumulated in histidine-containing, but otherwise conventional aqueous culture media on which histidine-requiring mutants of Brevibacterium, Corynebacterium, or Arthrobacter are cultured, and is readily recovered from the fermentation broth.

7 Claims, No Drawings

METHOD OF PRODUCING L-HISTIDINOL BY FERMENTATION

This invention relates to the fermentative production of L-histidinol, and in particular, to a method of producing L-histidinol at low cost from readily available raw materials.

L-Histidinol has been used in medical research and as an intermediate in the production of histidine, urocanic acid, and histamine.

It has been known since 1951 (J.A.C.S. 73, 1897) that a histidine-requiring mutant strain of Escherichia coli can produce extracellular L-histidinol. However, the amount of L-histidinol accumulating in the culture medium is too small to apply this method on an industrial scale.

We have now found that histidine-requiring mutant strains of the genera Brevibacterium, Corynebacterium and Arthrobacter produce and accumulate substantial amounts of L-histidinol in economically useful amounts when cultured aerobically on otherwise conventional culture media containing histidine.

The mutant strains are readily obtained in a conventional manner by exposing vegetative cells or spores of the parent to ultraviolet light, to X-rays, or to gamma rays, and by screening the irradiated material for its response to histidine. Suitable mutant strains have also been obtained by contacting the parent strain with sodium nitrite solution in a well known manner.

Brevibacterium flavum ATCC 21349, Corynebacterium acetoacidophilum ATCC 21350, and Arthrobacter citreus ATCC 21348 are representative microorganisms which may be employed in the present method. They may be obtained from the American Type Culture Collection in Washington, D.C.

The culture media employed for producing L-histidinol by our method may be entirely conventional. They must contain an assimilable carbon source, an assimilable nitrogen source, growth promoting organic substances, and inorganic salts or ions. Suitable carbon sources include carbohydrates, such as glucose, fructose, maltose, sucrose, xylose, starch hydrolyzate, molasses, and organic acids such as acetic acid and citric acid. Alcohols and hydrocarbons have also been employed successfully as carbon sources.

Nitrogen may be provided by ammonium salts of inorganic acids such as ammonium sulphate and ammonium chloride, or by ammonia in aqueous solution or in the gaseous state which may be used simultaneously for pH control in a known manner. Organic nitrogen-bearing compounds such as amino acids, urea or protein hydrolyzate may also provide assimilable nitrogen.

Supplemental inorganic nutrients required include the essential inorganic ions available from potassium phosphate, magnesium sulfate, manganese sulfate, zinc sulfate, ferrous sulfate, sodium chloride, and sodium carbonate.

Organic growth promoting substances which improve the yield and the rate of production of L-histidinol include vitamins and fatty acids, and may be added to the culture medium in the form of substances which yield the active agent under the conditions of fermentation, such as peptone, yeast extract, corn steep liquor, soybean protein hydrolyzate, and various other extracts of vegetal and animal tissues, well known in themselves.

Histidine should be present in the culture medium in a preferred concentration of 5 to 50 mg. per deciliter. At lower concentrations, the growth rate of the microorganisms and the rate of L-histidinol production are very low, and at higher concentrations, the growth of the microorganisms normally proceeds rapidly, but the rate of L-histidinol production is reduced.

For a good yield of L-histidinol, the fermentation should be carried out with aeration and agitation in order to supply sufficient oxygen to the broth. Best yields of L-histidinol cannot be obtained unless the pH value of the culture medium is controlled between 5 and 9. Aqueous ammonia, gaseour ammonia, calcium carbonate, or alkali metal hydroxides may be added to the nutrient medium from time to time, as required, to maintain the desired pH range. For best results, the temperature of the broth should be held between 25° and 37° C. during fermentation. The fermentation is preferably carried out for 2 to 5 days.

The recovery of L-histidinol from the culture broth may follow known methods. The bacterial cells may be removed by filtration or centrifuging, and L-histidinol may be recovered by employing an ion-exchange resin in combination with treatment by active carbon and a precipitation method.

The product of the present method has been identified as L-histidinol by the Rf value of its paper chromatogram, the color development by diazo reaction of the paper chromatogram, and the fact that histidine-requiring microorganisms which can also grow on a medium containing L-histidinol can grow on a conventional medium to which an eluate of the paper chromatogram was added.

The L-histidinol accumulated in the broth was determined quantitatively by Macpherson's colorimetric method (Biochemical Journal Vol. 40, page 470, 1946).

The following Examples are further illustrative of the present invention and it will be understood that the invention is not limited thereto.

EXAMPLE 1

An aqueous culture medium was prepared from sucrose 7 percent, $KH_2PO_4$ 0.2 percent, $MgSO_4 \cdot 7H_2O$ 0.04 percent, ammonium sulfate 1.0 percent, dry yeast 1.0 percent, and polypepton 0.2 percent, and 20 ml batches of the solution were placed in 500 ml. shaking flasks and sterilized at 115° C. for 5 minutes. Separately sterilized calcium carbonate was thereafter added in an amount of 2.5 percent to each batch in order to adjust the pH to 6.5.

The aqueous media were inoculated with Brevibacterium flavum ATCC 21349, which had been previously cultured on bouillon slants at 30° C. for 24 hours. The fermentation was carried out at 28° C. for 70 hours. 2.3 g. L-histidinol (as dihydrochloride) were formed per liter of the broth.

The microbial cells were removed from 5 liters of the broth by centrifuging, and the L-histidinol in the solution was absorbed on carbon powder at pH 4 and eluted with a mixture of 85 percent ethanol and 15 percent 10N hydrochloric acid. The eluate was partly evaporated to remove the alcohol and the concentrate was diluted with water, adjusted to pH 1.0, and passed over a column packed with a cation exchange resin (Dowex-50, H type). The column was washed with water, and the L-histidinol was then eluted with 1.5N hydrochloric acid and 2.5N hydrochloric acid. The eluate was partly evaporated in a vacuum and 5.6 g. crude, crystalline L-histidinol dihydrochloride were precipitated from the residual liquid by addition of cool alcohol.

EXAMPLE 2

An aqueous culture medium was prepared from glucose 10 percent, $KH_2PO_4$ 0.1 percent, $MgSO_4 \cdot 7H_2O$ 0.04 percent, ammonium sulfate 4%, biotin 10 $\mu g./dl$, thiamine hydrochloride 20 $\mu g./dl$, $Fe^{++}$ 2 ppm, $Mn^{++}$ 2 p.p.m. and histidine hydrochloride 25 mg percent. Its pH was adjusted to 7.5 with aqueous ammonia. 20 Milliliter batches of the solution were placed in 500 ml. shaking flasks, and were sterilized by steam at 110° C. for 5 minutes. They were then inoculated with Brevibacterium flavum ATCC 21349, which had been previously cultured as described in Example 1, and the fermentation was carried out at 31.5° C. for 55 hours. 5.8 g. L-histidinol (as di-hydrochloride) were found in each liter of the broth.

EXAMPLE 3

An aqueous culture medium was prepared to contain sucrose 7 percent, $KH_2PO_4$ 0.15 percent, $MgSO_4 \cdot 7H_2O$ 0.04 percent, diammonium hydrogen phosphate 1.5 percent, biotin 100 $\mu g./l$, thiamine hydrochloride 500 $\mu g/l$, iron ion 2 p.p.m., manganese ion 2 p.p.m., yeast extract 0.1 percent, soy bean protein hydrolyzate 4 percent, and calcium carbonate (sterilized separately) 3 percent, and its pH was adjusted to 7.0. 20 Milliliter batches of the solution were placed in 500 ml. shaking flasks, and were sterilized by steam at 110° C. for 5 minutes. They were then inoculated with Corynebacterium acetoacidophilum ATCC 21350, which had been previously cultured on bouillon-yeast agar slants at 30° C. for 24 hours.

The fermentation was carried out at 30° C. for 48 hours. 3.3 g. L-histidinol (as di-hydrochloride) were found in each liter of the broth.

7.2 g. Crude, crystalline L-histidinol di-hydrochloride were recovered from 5 liters of the broth by the method of Example 1.

EXAMPLE 4

An aqueous culture medium was prepared to contain glucose 10 percent, $KH_2PO_4$ 0.1 percent, $MgSO_4 \cdot 7H_2O$ 0.04 percent, ammonium sulfate 3 percent, biotin 50 µg./l, thiamine hydrochloride 200 µg./l, iron ion 2 p.p.m., manganese ion 2 p.p.m., L-histidine hydrochloride 20 mg. percent, soy bean protein hydrolyzate 1 percent, and calcium carbonate (sterilized separately) 5 percent, and its pH was adjusted to 7.5. 20 Milliliters batches of the solution were placed in 500 ml shaking flasks, and were sterilized by steam at 110° C. for 5 minutes. They were then inoculated with Arthrobacter citreus ATCC 21348, which had been previously cultured as described in Example 3. The fermentation was carried out at 30° C. for 72 hours. 4.6 Grams per liter L-histidinol (as di-hydrochloride) were found in the broth.

What we claim is:
1. A method of producing L-histidinol which comprises:
   a. culturing a histidine-requiring microorganism of the group consisting of Brevibacterium flavum ATCC 21349, Corynebacterium acetoacidophilum ATCC 21350, and Arthrobacter citreus ATCC 21348 under aerobic conditions in a medium containing an assimilable carbon source, an assimilable nitrogen source, essential inorganic salts, and an effective amount of histidine, while maintaining the culture medium at a pH of 5 to 9, until L-histidinol accumulates in the medium; and
   b. separating the accumulated L-histidinol from said medium.

2. A method as set forth in claim 1, wherein said histidine is present in said medium in an amount of 5 to 50 milligrams per deciliter.

3. A method as set forth in claim 1, wherein the histidine-requiring strain is Brevibacterium flavum ATCC 21349.

4. A method as set forth in claim 1, wherein the histidine-requiring strain is Corynebacterium acetoacidophilum ATCC 21350.

5. A method as set forth in claim 1, wherein the histidine-requiring strain is Arthrobacter citreus ATCC 21348.

6. A method as set forth in claim 1, wherein said L-histidinol is recovered in the form of a crystalline salt thereof.

7. A method as set forth in claim 6, wherein said salt is the hydrochloride.

* * * * *